March 1, 1960 H. ALLEN 2,926,687
LUBRICATED CONDUIT TYPE GATE VALVES
Filed June 5, 1957 2 Sheets-Sheet 1

Herbert Allen
INVENTOR.

BY Browning, Simms & Hyer
ATTORNEYS

March 1, 1960 H. ALLEN 2,926,687
LUBRICATED CONDUIT TYPE GATE VALVES
Filed June 5, 1957 2 Sheets-Sheet 2

Herbert Allen
INVENTOR.

BY Browning, Simms & Hyer
ATTORNEYS

United States Patent Office 2,926,687
Patented Mar. 1, 1960

2,926,687

LUBRICATED CONDUIT TYPE GATE VALVES

Herbert Allen, Houston, Tex., assignor to Cameron Iron Works, Inc., Houston, Tex., a corporation of Texas Application June 5, 1957, Serial No. 663,775

3 Claims. (Cl. 137—246.13)

This invention relates broadly to lubricated conduit type gate valves and, more particularly, to improved valves of this type which require less maintenance than similar valves of the prior art.

In a conduit type gate valve, the gate is provided with an opening therethrough and is reciprocable within a guideway intersecting the flowway through the valve body between an open position in which the opening is aligned with the flowway and a closed position in which a solid portion of the gate is disposed across the flowway. It is common practice to contain a grease within the valve in such a manner as to provide a thin film thereof between the adjacent seating surfaces on the gate and the valve body. Such lubrication facilitates movement of the gate within the guideway and seals against leakage past the gate in its closed position.

The grease is conventionally presented to the adjacent surfaces by means of grooves arranged about either the flowway through the valve body or the opening through the valve member. In any case, however, heretofore these grooves have been so arranged that they are exposed to the flowway through the valve body during at least a portion of the movement of the gate between opened and closed positions. As a result, unless special precautions have been taken, the grease has been washed away by fluid flowing through the valve so that it requires frequent replacement.

It is well known that in addition to dirt, line fluids frequently contain diluents which will destroy either the lubricating or sealing properties of the grease as well as abrasive materials which cause scoring of the adjacent seating surfaces. Moreover, when mixed with the grease, these diluents and abrasives tend to concentrate on or near the seating surfaces. Consequently, the grease which is not washed away may in short time be contaminated by the line to such an extent as to be incapable of performing its intended purposes.

An object of the present invention is to lessen such loss and contamination of grease in a conduit type gate valve to a minimum by providing a grease groove therein so arranged as to lubricate and seal between the adjacent seating surfaces thereof during opening and closing of the valve without exposing said groove to line fluid.

It is another object of the invention to provide a conduit type gate valve in which grease arranged in a groove of the character described in the foregoing object is caused to circulate therethrough upon each cycle of operation of the gate, so that the grease is maintained as homogeneous as possible and the diluents and abrasive materials within the grease are removed from the seating surfaces.

A further object is to provide a gate valve construction especially well suited for accomplishing the above objects.

Other objects, advantages and features of this invention will be apparent to one skilled in the art upon a consideration of the written specification, the attached claims and the annexed drawings.

A gate valve constructed in accordance with the present invention comprises a body having a flowway therethrough and a guideway therein intersecting the flowway. A gate is mounted on the body for reciprocation within the guideway between flowway opening and flowway closing positions, and this gate has an opening therethrough alignable with the flowway in its open position and a solid portion disposable across the flowway in its closed position. In a conduit type gate valve of this type, surfaces on the solid portion of the gate are disposable in the closed position thereof adjacent seating surfaces on the valve body which surround the flowway on both sides of the guideway.

A groove in the body which connects with a reservoir for containing grease and opens onto the guideway is extended transversely of the path of movement of the gate so that a film of grease is wiped across the seating surface on the solid portion of the gate upon each cycle of opening and closing movement thereof. However, in accordance with one novel aspect of the invention, this groove is disposed on only the side of the flowway away from which the gate opening is moved upon closing of the gate so that the groove is never exposed to line fluid. It is still further contemplated that a groove of the type above described may be provided on the valve body adjacent both sides of the guideway for wiping a film of grease upon the seating surfaces on both sides of the solid portion of the gate.

According to another novel aspect of the present invention, the grease reservoir comprises a pair of substantially confined chambers within the body which are expanded and contracted, respectively, in response to movement of the gate between opened and closed positions, and the aforementioned groove connects these chambers so that grease contained therein is circulated through the groove upon such movement of the gate. In this manner, the diluents and abrasives which may eventually find access to the grease are forced away from the seating surfaces, and the grease is kept as homogeneous as possible. For this latter purpose, it is preferred that the chambers be contractible to as small a volume as possible so that at least substantially all of the grease will be circulated from one chamber to the other.

The above mentioned chambers are formed on opposite ends of the gate so that the gate itself acts as a piston and grooves on each side of the body are supplied with grease from a common reservoir.

In the drawings, wherein like reference characters are used throughout to designate like parts:

Figure 1:
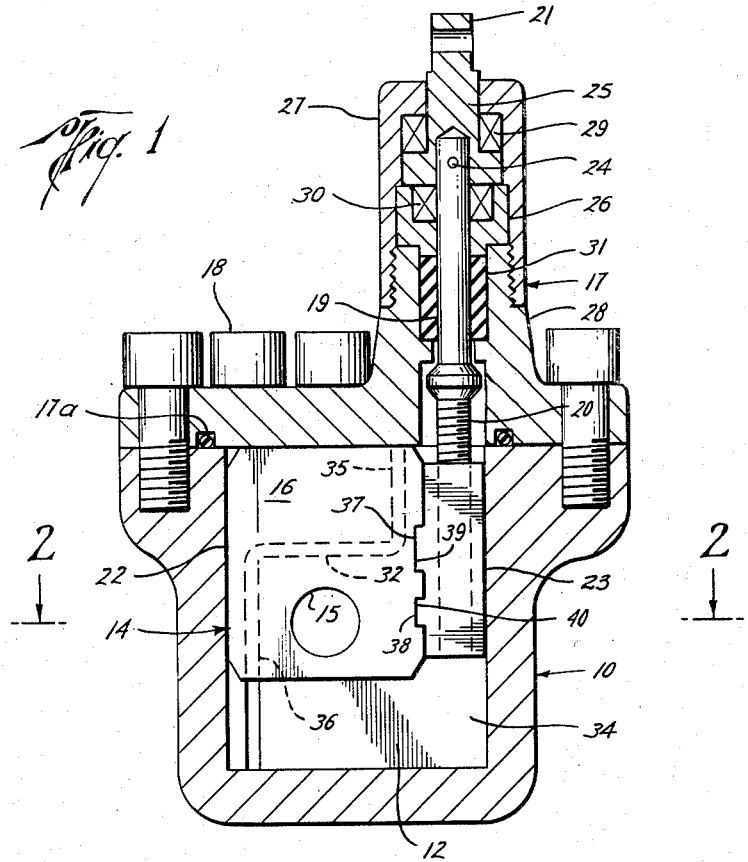
Fig. 1 is a vertical sectional view of one embodiment of a gate valve constructed in accordance with the present invention, and showing the gate in its open position.
Figure 2:
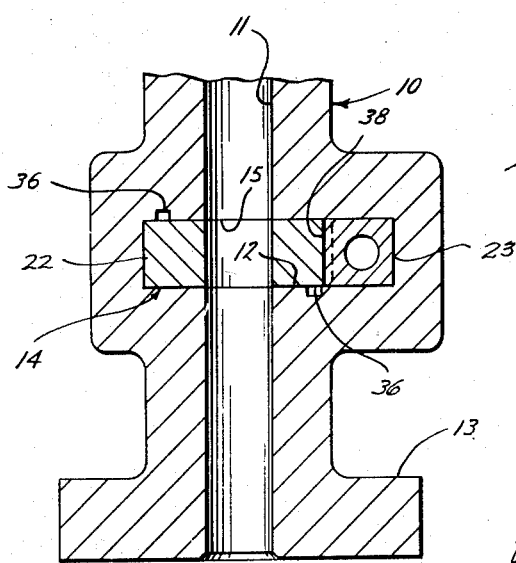
Fig. 2 is a horizontal sectional view of the gate valve of Fig. 1, taken substantially along broken line 2—2.
Figure 3:
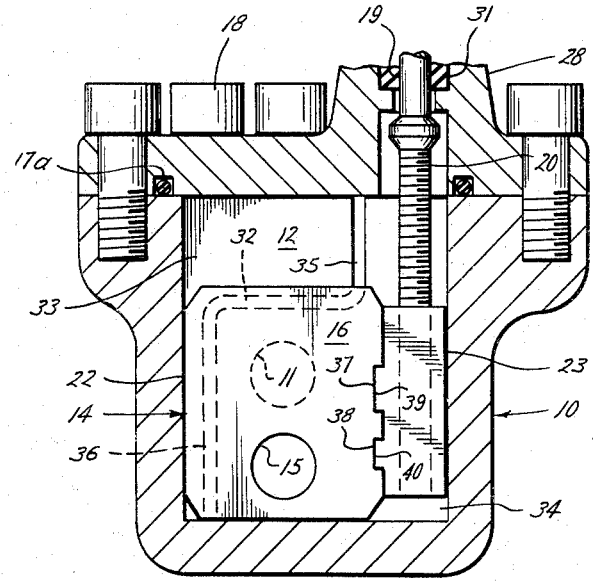
Fig. 3 is a vertical sectional view similar to Fig. 1, but showing the gate in its closed position.

Referring now particularly to the above described drawings, the gate valve embodiment shown in Figs. 1 to 3 comprises a valve body 10 having a flowway 11 therethrough and a cavity therein which defines a guideway 12 intersecting the flowway and opening to one side of the valve body. The opposite ends of the valve body 10 may be provided with flanges 13 or other suitable means for connection in a pipeline.

A gate 14 is mounted on the body for movement within the guideway 12 between flowway opening and flowway closing positions. For this purpose, the gate is provided with an opening 15 therethrough alignable with the flowway 11 in its open position (Figs. 1 and 2) and a solid portion 16 above the opening disposable across the flowway in its closed position (Fig. 3). An annular seating surface on the solid portion 16 of the gate is disposable in the closed position thereof adjacent a seating surface on the body which surrounds the flowway 11 therethrough. More particularly, such surfaces are provided on both sides of the solid portion of the gate for disposal adjacent seating surfaces of the body surrounding the flowway on opposite sides of the guideway 12.

A bonnet 17 is releasably connected to the valve body by means of bolts 18 so as to cover the opening from the guideway. An annular ring 17a carried by the lower end of the bonnet seals with the upper end of the body. The gate 14 is connected to the lower end 20 of a stem 19 which is supported within the bonnet for rotation but held thereby against vertical movement. The gate includes a paddle 22 releasably connected to a nut 23 provided with a threaded socket for connection within the threaded end 20 of the stem. With the gate fitting closely within the guideway, as shown in Fig. 2, rotation of the stem will reciprocate the paddle within said guideway.

The upper end of the stem 19 is pinned at 24 to an extension 25 which supports a part 21 exteriorly of the bonnet to permit rotation of the stem. The extension 25 is, in turn, supported above a bushing 26 and held down by a cap 27 threaded over a body portion 28 of the bonnet 17. As can also be seen from Fig. 1, annular seal members 29 and 30 may be provided about the extension 25 and stem 19, respectively. Each of the lower ends of the extension 25, bushing 26, and the seal members are enclosed within the cap 27, and a packing 31 is held between the lower end of the bushing and a restriction in the bonnet body portion 28 through which the stem 19 is extended.

Grooves 32 in the body open onto both sides of the guideway and extend relatively close to the flowway 11 in directions transversely of the movement of the gate 14. Thus, with the grooves connected to a grease reservoir, in a manner to be described hereinafter, movement of the gate 14 from the open position of Fig. 1 to the closed position of Fig. 3 will cause a film of grease within each groove to be wiped across each side of the solid portion 16 of the gate and the seating surface thereon. With the gate disposed in this closed position, these grease films will be disposed between the seating surfaces on the solid portion of the gate and the seating surfaces on the body surrounding the flowway at both sides of the guideway so as to seal against the leakage of line fluid past the gate. Upon movement of the gate back to its open position, these seating surfaces on the solid portion of the gate will be returned to a position for receiving fresh films of grease as the gate is again moved to its closed position.

However, as previously mentioned, the grooves 32 are disposed on only the side of the flowway away from which the opening 15 in the gate moves toward its closed position so that the grooves will never, during the cycle of gate movement, be exposed to line fluid. Thus, the only significant loss of grease will be from the film which has been wiped across the solid portion of the gate.

As can be seen from Figs. 1 and 3 of the drawings, grease may be contained within a reservoir comprising a pair of substantially confined and variable capacity chambers 33 (Fig. 3) and 34 (Fig. 1) formed within the guideway 12 above and below the gate 14, respectively. In this particular embodiment of the invention, each opposite end of transversely extending groove 32 is connected to one of the chambers by means of longitudinally extending grooves 35 and 36 in the body and also arranged to avoid communication with opening 15. Thus, as the gate is moved between opened and closed positions, and for purposes previously described, the gate acts as a piston to cause grease contained within the reservoir to pass through the groove 32 from one chamber to the other. Preferably, the gate 14 is so arranged within the guideway 12 as to abut with the upper and lower ends thereof in its opposite positions, and thereby circulate substantially all of the grease within the reservoir.

It will be understood that removal of the bonnet 17 permits replacement of the grease as well as the gate. The releasable connection between the paddle 22 and nut 23 need only hold the paddle against movement vertically with respect to the nut and, for this purpose, comprises slots 37 and 38 on one side edge of the paddle closely fittable over keys 39 and 40, respectively, on the inner side edge of the nut. These interfitting pairs of keys and slots may, as shown, be of different sizes so as to prevent improper assembly of the paddle with the nut.

Although it is intended merely as an illustration, the side mounting of the gate enables a compact overall valve construction. Obviously, the gate may be mounted in a more conventional manner, as shown, for example, in my copending application, Serial No. 651,748, filed April 9, 1957 now abandoned and entitled "Valve." Furthermore, the gate valve of the present invention may be provided with plates or the like for carrying replaceable seat elements, as shown in said copending application, in which case the above described grooves could be formed at least partially in the plates.

Figure 4:
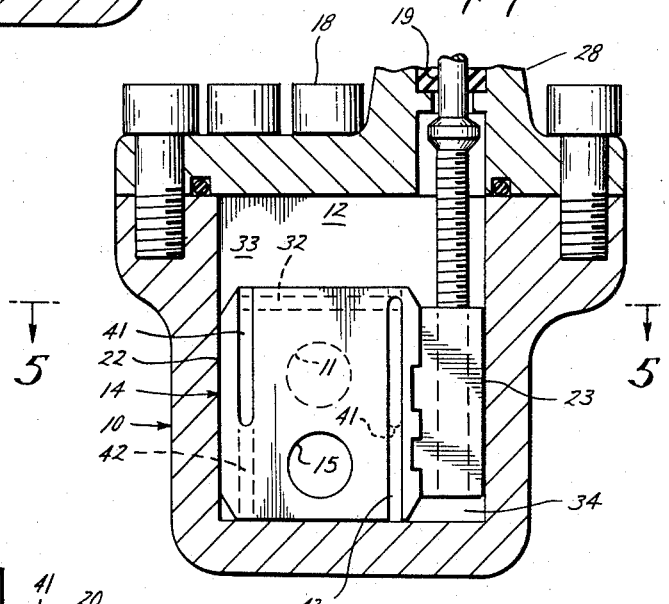
Fig. 4 is a vertical sectional view of another embodiment of a gate valve constructed in accordance with this invention, with the gate thereof in its closed position.
Figure 5:
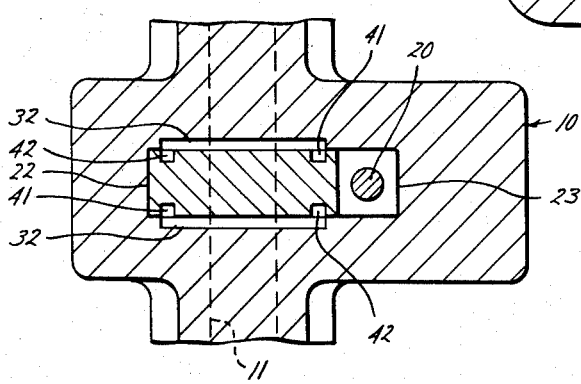
Fig. 5 is a horizontal sectional view of the gate valve of Fig. 4, taken substantially along broken line 5—5 of Fig. 4.

The embodiment of the invention illustrated in Figs. 4 and 5 corresponds in all respects to that above described, except with respect to the connection of laterally extending grease grooves 32 with the variable capacity grease chambers above and below the gate 14. In the gate valve of Figs. 4 and 5, the opposite ends of the grooves 32 are connected with such chambers by means of vertically extending grooves 41 and 42 formed on each side of the gate along opposite sides of gate opening 15. Thus, as illustrated in Fig. 4, each groove 41 connects one end of each groove 32 with the chamber above the gate, and each groove 42 connects with the other end of each groove 32 with the chamber below the gate.

More particularly, the gate grooves 41 and 42 extend from the upper and lower ends of the gate, respectively, to points intermediate such ends for maintaining communication with the opposite ends of the grooves 32 during movement of the gate between opened and closed positions. Thus, as the gate 14 is moved upwardly from its closed position (Figs. 4 and 5) to its open position (not shown), the grooves 41 and 42 will move over the opposite ends of grooves 32.

Since the grooves 41 and 42 extend vertically along opposite sides of gate opening 15, it is obvious that they will at no time during movement of the gate, communicate directly with line fluid. Of course, this is also true of grooves 32 as they occupy the same position in the body of the Figs. 4 and 5 embodiment of the invention as they do in the Figs. 1 to 3 embodiment. Other suitable arrangements of connecting grooves will be apparent to one skilled in the art.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

A many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A gate valve, comprising a body having a flowway therethrough and a guideway therein intersecting the flowway, a gate mounted in the body for reciprocation within the guideway between flowway opening and closing positions, said gate having an opening therethrough alignable with the flowway in its open position and a solid portion disposable across the flowway in its closed position, a surface on the solid portion of the gate disposable in the closed position thereof adjacent to a seating surface of the body which surrounds the flowway, a grease reservoir within the body comprising a pair of substantially confined chambers which are expanded and contracted, respectively, in response to movement of the gate between opened and closed positions, and means comprising a groove in the body connecting said chambers and opening onto said guideway for wiping a fresh film of grease across said seating surface of the gate upon each cycle of opening and closing movement of the gate, said groove consisting of a first portion extending transversely of the path of movement of the gate on only the side of the flowway away from which the gate opening is moved upon closing of the gate, and additional portions connecting opposite ends of the first portion of the groove with said chambers to confine the grease for passage through said first portion.

2. A gate valve, comprising a body having a flowway therethrough and a guideway therein intersecting the flowway, a gate mounted in the body for reciprocation within the guideway between flowway opening and closing positions and extending across said guideway to define a pair of substantially confined chambers for containing grease within said guideway above and below the gate which are expanded and contracted, respectively, in response to movement of the gate between opened and closed positions, said gate having an opening therethrough alignable with the flowway in its open position and a solid portion disposable across the flowway in its closed position, a surface on the solid portion of the gate disposable in the closed position thereof adjacent a seating surface of the body which surrounds the flowway, and means comprising a groove in the body connecting said chambers and opening onto the guideway for wiping a fresh film of grease across said seating surface of the gate upon each cycle of opening and closing movement of the gate, said groove consisting of a first portion extending transversely of the path of movement of the gate on only the side of the flowway away from which the gate opening is moved upon closing of the gate, and additional portions connecting opposite ends of the first portion of the groove with said chambers to confine the grease for passage through said first portion.

3. A gate valve of the character defined in claim 2, wherein the gate is disposed substantially adjacent the opposite ends of the guideway in its opened and closed positions, respectively, so as to circulate substantially all of the grease from one chamber to the other upon movement of the gate between said positions.

References Cited in the file of this patent

UNITED STATES PATENTS

| | | |
|---|---|---|
| 1,416,431 | Wilson | May 16, 1922 |
| 2,000,494 | Nordstrom | May 7, 1935 |
| 2,276,939 | Davis | Mar. 17, 1942 |
| 2,406,099 | Penick | Aug. 20, 1946 |